A. E. ROYLE.
HEAVIER THAN AIR FLYING MACHINE.
APPLICATION FILED OCT. 23, 1917.

1,340,914. Patented May 25, 1920.

UNITED STATES PATENT OFFICE.

ALBERT EDWARD ROYLE, OF PADDINGTON, NEAR SYDNEY, NEW SOUTH WALES, AUSTRALIA.

HEAVIER-THAN-AIR FLYING-MACHINE.

1,340,914. Specification of Letters Patent. Patented May 25, 1920.

Application filed October 23, 1917. Serial No. 198,014.

*To all whom it may concern:*

Be it known that I, ALBERT EDWARD ROYLE, a subject of the King of Great Britain, residing at No. 8 Glebe street, Paddington, near Sydney, in the State of New South Wales and Commonwealth of Australia, importer, have invented a new and useful Improvement in Heavier-Than-Air Flying-Machines, of which the following is a specification.

This invention relates to the propulsion of flying machines and has been devised in order that such machines may be constructed so that greater propelling force may be attained by the same expenditure of power as hitherto used and thus quicken the transit of the machines.

According to this invention the improvements in flying machines comprises principally an end to end open ended tube or casing positioned longitudinally and preferably centrally of a machine surrounding such devices being a revolving screw or propeller or a multiplicity or plurality of screws or propellers or other power propelling devices driven by engines aboard the machine for drawing in at one end and forcing out at the other end of the casing the sustaining air of the machine as the case may be.

If desired more than one casing may be used in one machine so positioned that the proper balance of the machines will not be affected and the casings may taper slightly toward the rear or discharge end.

But in order that a practical embodiment of the improvements according to this invention may be readily effected the same will now be described with reference to the drawings accompanying and forming part of this complete specification in which the figures show diagrammatically the present improvements in ordinary constructions.

Figure 1:
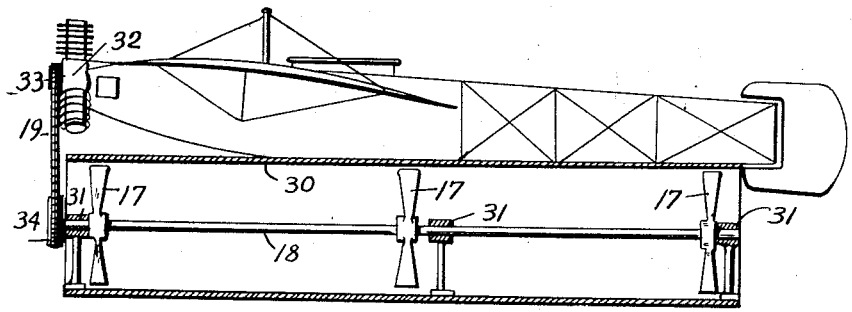
Figure 2:
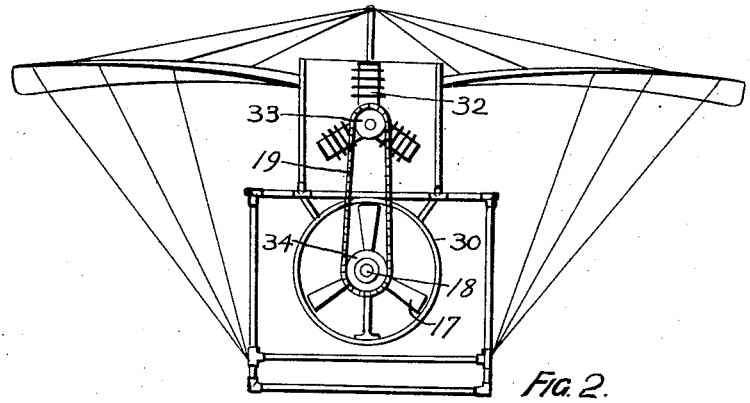
Figure 3:
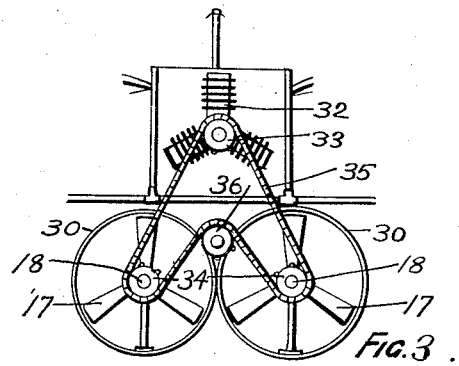

Figure 1 represents a longitudinal section and Fig. 2 a front elevation of a flying machine with an end to end casing and Fig. 3 shows twin casings in a similar machine.

As applied to a flying machine the end to end casing 30 is preferably positioned as shown in Fig. 1, the propelling shaft 18 in bearings 31 carrying screw propellers 17 preferably one forward one aft and one intermediate. These propellers 17 are driven from ordinary engine 32 by chain 19 around sprockets 33 and 34 respectively on the engine shaft and the propelling shaft 18.

When two open ended casings 30 are applied to a flying machine as shown in Fig. 3 the propelling shafts 18 are driven from the engine shaft as before described either by a separate chain to each propelling shaft or by one chain 35 on the engine shaft sprocket 33 passing around sprocket 34 on one propelling shaft 18 over an idle sprocket 36 and around sprocket 34 on the second propelling shaft 18.

In propelling a flying machine the propelling shaft is revolved and the propellers thereon draw air in at the fore end and force it out at the rear.

It is to be understood that the applications of the improvements described and illustrated are convenient forms in which the improvements may be applied and that they may be applied in many other forms and constructions without departing from the spirit and scope of the invention.

What I claim is:—

1. A heavier-than-air flying machine comprising in combination with a long relatively narrow fuselage, wings extending laterally from the forward portion of the fuselage, and an engine at the forward end of the fuselage, of a propelling unit supported beneath the fuselage and connected for operation to said engine, said propelling means comprising a conduit co-extensive in length with the fuselage and open at each end, and a plurality of propellers disposed along said conduit.

2. A heavier-than-air flying machine comprising in combination with a long relatively narrow fuselage, wings extending laterally from the forward portion of the fuselage and an engine at the forward end of the fuselage, of a plurality of propelling units supported beneath the fuselage, a single operating chain connecting said engine and units for operation together, said units each comprising a conduit co-extensive in length with the fuselage and open at each end, and a plurality of propellers disposed along said conduit.

In testimony whereof I have signed my name to this specification in the presence of two subscribing witnesses.

ALBERT EDWARD ROYLE.

Witnesses:
I. EASTON,
M. SLADEN.